US008055532B2

(12) United States Patent
Min et al.

(10) Patent No.: US 8,055,532 B2
(45) Date of Patent: Nov. 8, 2011

(54) MOST INFORMATIVE THRESHOLDING OF HETEROGENEOUS DATA

(75) Inventors: Wanli Min, Mount Kisco, NY (US); Aleksandra Mojsilovic, New York, NY (US)

(73) Assignee: International Business Machines Corporation, Armonk, NY (US)

(\*) Notice: Subject to any disclaimer, the term of this patent is extended or adjusted under 35 U.S.C. 154(b) by 1359 days.

(21) Appl. No.: 11/396,612

(22) Filed: Apr. 4, 2006

(65) Prior Publication Data

US 2007/0233550 A1 Oct. 4, 2007

(51) Int. Cl.
*G06Q 30/00* (2006.01)
(52) U.S. Cl. ......... 705/10; 705/7; 705/8; 705/9; 705/14; 705/35
(58) Field of Classification Search .......... 705/10, 705/14, 35, 7, 8, 9
See application file for complete search history.

(56) References Cited

U.S. PATENT DOCUMENTS

| 2002/0032645 | A1* | 3/2002 | Nozaki et al. | 705/38 |
| 2002/0046096 | A1* | 4/2002 | Srinivasan et al. | 705/14 |
| 2002/0116266 | A1* | 8/2002 | Marshall | 705/14 |
| 2003/0014304 | A1* | 1/2003 | Calvert et al. | 705/14 |
| 2003/0212619 | A1* | 11/2003 | Jain et al. | 705/35 |
| 2005/0010472 | A1* | 1/2005 | Quatse et al. | 705/14 |
| 2005/0144099 | A1* | 6/2005 | Deb et al. | 705/35 |

OTHER PUBLICATIONS

Ruey S. Tsay, "Testing and Modeling Multivariate Modles", Journal of the American Statistical Association, vol. 93, No. 443, Sep. 1998, pp. 1188-1202.

Hirotugu Akaike, "A New Look at the Statistical Model Identification", IEEE Transactions on Automatic Control, vol. AC-19, No. 6, Dec. 1974, pp. 716-723.

Jushan Bai, "Estimation of a Change Point in Multiple Regression Models", The Review of Economics and Statistics, vol. 79, No. 4, Nov. 1997, pp. 551-563.

James D. Hamilton, "Specification Testing in Markov-Switching Time-Series Models", Journal of Econometrics 70, 1996, pp. 127-157.

Bruce E. Hansen, "Sample Splitting and Threshold Estimation", Econometrica, vol. 68, No. 3, May 2000, pp. 575-603.

Mehmet Caner, et al., "Instrumental Variable Estimation of a Threshold Model", Cambridge University Press, 2004 pp. 813-843.

S. Kullback, et al., "On Information and Sufficiency", The Annals of Mathematical Statistics, vol. 22, No. 1, Mar. 1951, pp. 79-86.

\* cited by examiner

*Primary Examiner* — Nga B. Nguyen
(74) *Attorney, Agent, or Firm* — Daniel P. Morris, Esq.; McGinn IP Law Group, PLLC

(57) ABSTRACT

A method of thresholding of a database of customer purchasing history using a computer, includes providing a customer purchase history database including data regarding customer satisfaction, awareness of vendor brands, previous purchasing history, and size of customer budget, providing a predetermined threshold regarding the data, establishing, in the computer, boundaries surrounding the predetermined threshold, splitting the data, in the computer, to maximize the differences in the data across the split; generating, in the computer, a model of the data, in the computer, based upon the split, and allocating marketing resources based upon the model.

10 Claims, 3 Drawing Sheets

MOST INFORMATIVE THRESHOLDING OF HETEROGENEOUS DATA

BACKGROUND OF THE INVENTION

1. Field of the Invention

The present invention generally relates to a system and method for most informative thresholding of heterogeneous data.

2. Description of the Related Art

In many applications involving thresholding, regression analysis, and parameter estimation the relationship between the dependent variable and explanatory variables has different characteristics in different regimes of certain key variables. In such cases, it is difficult to fit a single model to the entire dataset. It is necessary to partition the sample and fit different classes of models to these subsamples. Such threshold models emerge in various contexts, including change-point multiple regression and frequently used regime switching models. Threshold models have been studied extensively, especially in the econometrics literature. However, linear functional form used in these models is very restrictive and often leads to inferior models.

Moreover, it is not always possible to determine a functional form that describes the underlying process—in this case a nearly model-free measure is needed to differentiate the different regimes.

Threshold models have been studied extensively, especially in the econometrics literature where the models typically take the form of:

$$y_i = \theta_1 x_i + \epsilon_i, \text{ for } z_i \leq g, \text{ and } y_i = \theta_2 x_i + \epsilon_i, \text{ for } z_i > g \quad (1)$$

Where:
y is a dependent variable;
x is a vector of an explanatory variable;
z is a threshold variable;
$\{\theta_k\}$ is a model parameter; and
g is an identified threshold.

The estimation procedure and statistical distribution properties of the estimated threshold $\hat{g}$ have been studied. However, the linear functional form that is assumed is very restrictive and often leads to inferior models.

Moreover, it is not always possible to determine a functional form that describes the underlying process—in this case a nearly model-free measure is needed to differentiate the different regimes.

Conventional methods and systems may attempt to distinguish more profitable clients from less profitable clients. These systems and methods may attempt to pre-define profitability based upon a relationship to a predetermined threshold. These systems and methods may then categorize these clients as being profitable if they exceed the threshold and less profitable if the do not exceed the threshold. These systems and methods may then examine the differences between these two categories of clients, adjust the threshold and then re-run the analysis in an attempt to arrive at a threshold which adequately distinguishes the clients. This process which is conventionally performed by these systems and methods is very inefficient and oftentimes results in inaccurate models.

What is needed is an approach to modeling of heterogeneous data where the relationship between a dependent variable and explanatory variables varies across different regimes of a threshold variable.

SUMMARY OF THE INVENTION

In view of the foregoing and other exemplary problems, drawbacks, and disadvantages of the conventional methods and structures, an exemplary feature of the present invention is to provide a method and structure in which an analysis of data is performed blindly such that data is split adaptively.

In an exemplary aspect of the present invention, a method for thresholding of a database of customer purchasing history using a computer, includes providing a customer purchase history database including data regarding customer satisfaction, awareness of vendor brands, previous purchasing history, and size of customer budget, providing a predetermined threshold regarding the data, establishing, in the computer, boundaries surrounding the predetermined threshold, splitting the data, in the computer, to maximize the differences in the data across the split; generating, in the computer, a model of the data based upon the split, and allocating marketing resources based upon the model.

An exemplary embodiment of the present invention targets two classes of problems where traditional classifiers, such as the three aforementioned examples, can be applied, but yield sub-optimal results. Specifically, for known regression models, this invention establishes a procedure that consistently estimates the thresholds, model parameters, and identifies the number of regimes.

In a more general scenario, without assuming a form of the model, this invention proposes a non-parametric procedure that leads to the most informative partition of samples.

An exemplary embodiment of the present invention provides a methodology for determining an underlying structure in the data, determining optimal thresholds for development of multi-regime models and analyzing complex relationships between dependent and explanatory variables in a problem of interest.

In many applications involving thresholding, regression analysis and parameter estimation, the relationship between the dependent variable and explanatory variables has different characteristics in different regimes of certain key variables. The inventors considered this problem under two different scenarios.

With known regression models, the inventors invented a procedure that consistently estimates the thresholds, model parameters and identifies the number of regimes.

In a more general scenario, without assuming a form of the model, the inventors invented a non-parametric procedure that leads to the most informative partition of samples.

An exemplary embodiment of the present invention is applied to a business analytics application which provides many advantages as an exploratory data analysis tool.

These and many other advantages may be achieved with the present invention.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
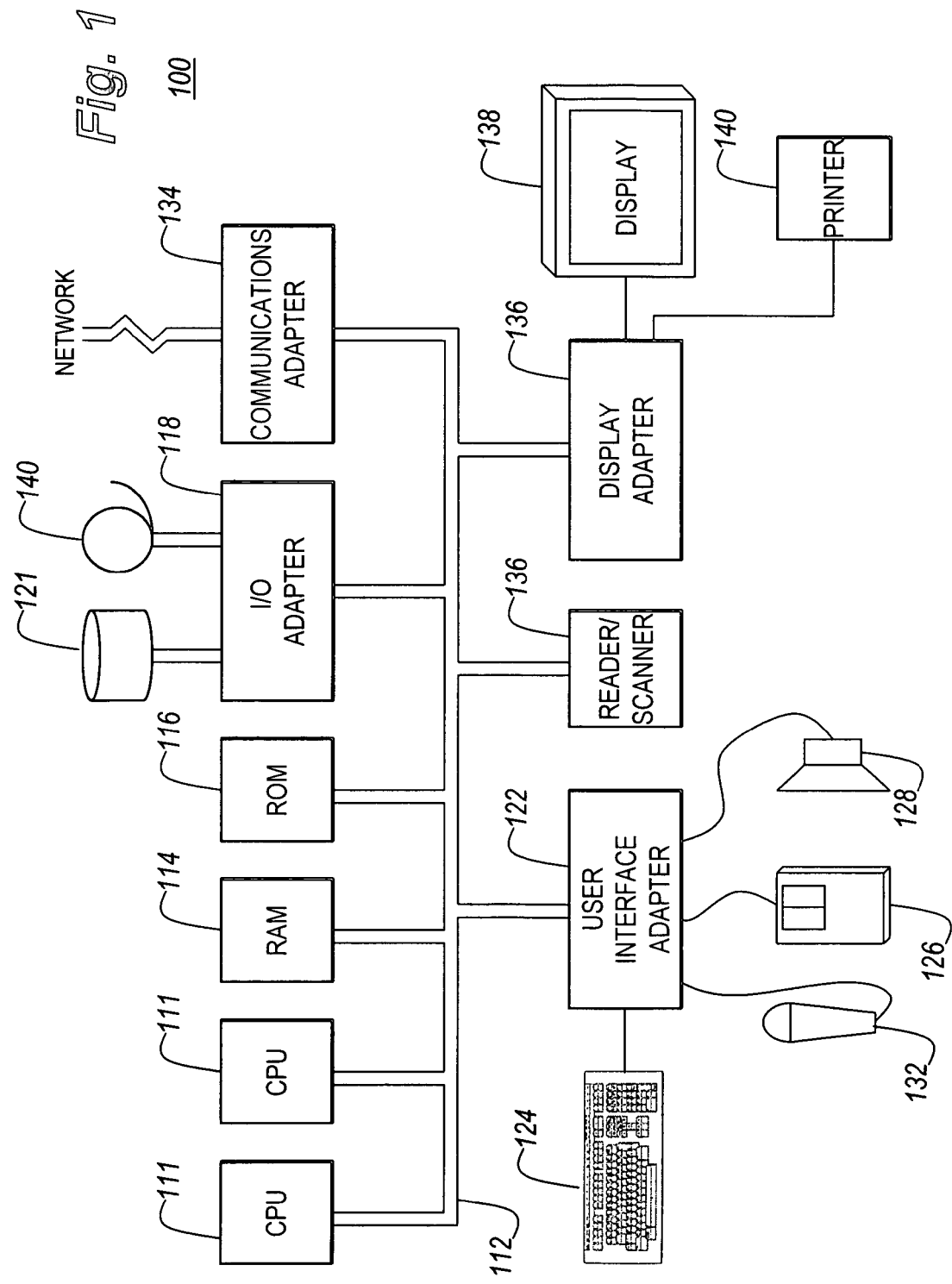
FIG. 1 illustrates an exemplary hardware/information handling system 100 for incorporating the present invention therein.
Figure 2:
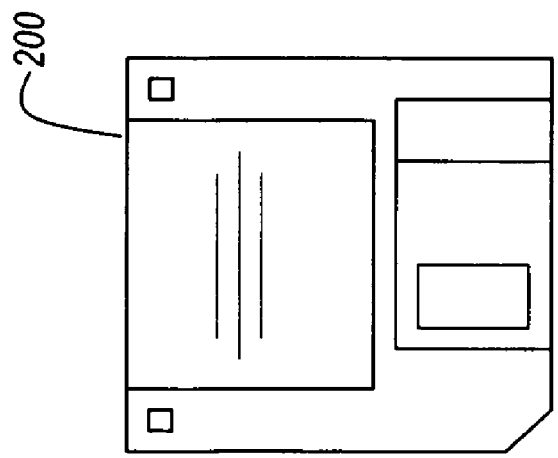
FIG. 2 illustrates a signal bearing medium 200 (e.g., storage medium) for storing steps of a program of a method according to the present invention.
Figure 3:
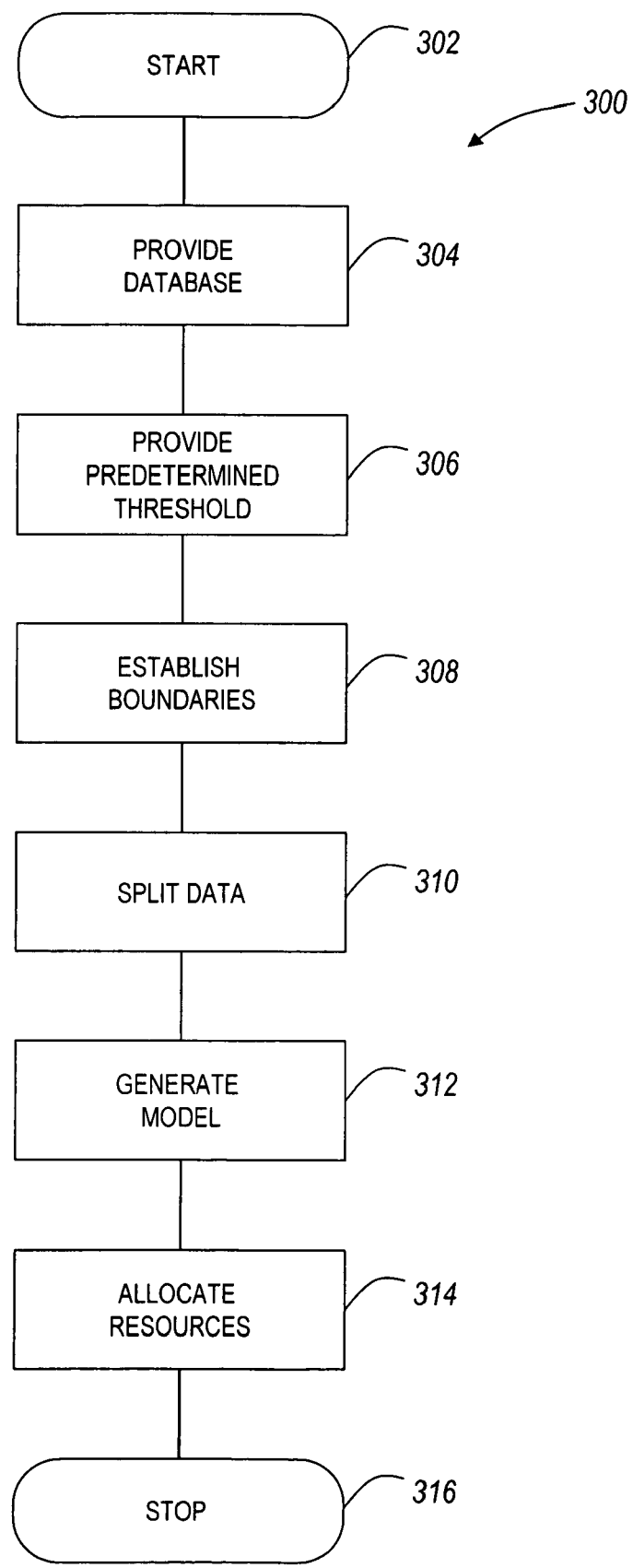
FIG. 3 is a flowchart of one exemplary method in accordance with the present invention.

Referring now to the drawings, and more particularly to FIGS. 1-3, there are shown exemplary embodiments of the method and structures of the present invention.

FIG. 1 illustrates a typical hardware configuration of an information handling/computer system 100 for use with the invention and which preferably has at least one processor or central processing unit (CPU) 111.

The CPUs 111 are interconnected via a system bus 112 to a random access memory (RAM) 114, read-only memory (ROM) 116, input/output (I/O) adapter 118 (for connecting peripheral devices such as disk units 121 and tape drives 140 to the bus 112), user interface adapter 122 (for connecting a keyboard 124, mouse 126, speaker 128, microphone 132, and/or other user interface device to the bus 112), a communication adapter 134 for connecting an information handling system to a data processing network, the Internet, an Intranet, a personal area network (PAN), etc., and a display adapter 136 for connecting the bus 112 to a display device 138 and/or printer 140.

In addition to the hardware/software environment described above, a different aspect of the invention includes a computer-implemented method for performing the below described methods. As an example, these methods may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 111, as represented by the fast-access storage for example. Alternatively, the instructions may be contained in another signal-bearing media, such as a magnetic data storage diskette 200 (FIG. 2), directly or indirectly accessible by the CPU 111.

Whether contained in the diskette 200, the computer/CPU 211, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

An illustrative example of a problem that may be addressed with an exemplary embodiment of the present invention is a business analytics application, that aims to discover relationships between customer behavior and many other variables that might have an influence on customer behavior. Let us assume that it is desired to track existing customers of a software vendor and understand if variables, such as client satisfaction, awareness of the vendor's brand, previous purchasing history, size of the information technology department's budget, changes in the client corporation, affect the future purchasing power of the customer.

Typically, such relationships are highly non-linear and cannot be accurately modeled with, simple regression models. Let us, for example, consider the relationships between the growth in spending, and the previous purchases made by the clients.

Usually, the "uncommitted" clients, who previously made only small purchases, are not likely to increase future spending, while the largest growth is expected from the clients which have already made significant investments in software and are very likely to continue to invest more in either new products or in the upgrades and maintenance of the existing ones. As the relationship is highly non-linear, the correlation between the two variables of interest will be quite small, indicating that a variable describing previous purchases has very little predictive power over future purchasing growth. Consequently, any simple model for purchasing growth will not benefit from including the information about previous purchases into the model. Therefore, there is clearly a need for a method, which will identify different regimes of data, where the correlation between the variables of interest clearly exists. Thereby, by identifying such regimes, one can build a far more accurate model of client behavior.

An exemplary embodiment of the present invention may be provided with a predetermined threshold, establish boundaries in a data set around the predetermined threshold, analyze the data between those boundaries and split the data between those boundaries in such a manner that maximizes discriminability between the split data sets. In this manner, a model may be generated based upon the maximum discriminability that will enable business decisions to more correctly be made.

For example, based upon the maximum discriminability, marketing strategies may be made which allocate marketing resources.

An exemplary embodiment of the present invention may also determine a maximum discriminability within a database having several different regimes each having a different distribution. This exemplary embodiment may estimate the boundaries of the different regimes, compute the number of different regimes, and partition the regimes to isolate the distribution.

An exemplary embodiment of the present invention may rely upon the determination of maximum discriminability to guide the development of a model of the data. In this manner, more accurate models may be developed. For example, with an exemplary embodiment of the present invention, an accurate revenue growth model may be developed based upon a database of clients and the products that have been acquired by those clients.

For example, it may be assumed that the amounts that have been spent by clients in the past may be related to future revenue growth. An exemplary embodiment of the invention may analyze a database of these clients and the amount that each of these clients spent with an organization. The results of the analysis may be valuable for developing a model with which proposed marketing techniques may be designed.

For data having multiple regions, an exemplary embodiment of the invention may determine the regimes and this determination may then be used to generate a model for each regime.

In accordance with an exemplary embodiment of the present invention, let y be the dependent variable, x the vector of explanatory variables, and z the threshold variable. First consider a simplest case where x is a scalar, and the data is described by the triplets $(x_i, y_i, z_i)$. There are K different regimes of the threshold variable z, defined by, $-\infty < g_1 < g_2 < \ldots < g_{k-1} < \infty$ and the true model in regime k is $y_i = f(\theta_k, x_i) + \epsilon_i$, with $\epsilon_i \sim N(0, \sigma^2)$, and known form for $f(.)$.

An exemplary embodiment of the present invention identifies thresholds, $\{g_k\}$, and the model parameters, $\{\theta_k\}$.

For any k, $\{\theta_k\}$ can be consistently estimated through the least square as:

$$\min_{\theta} \sum_{x \in k_{th} regime} [y_i - f(\theta, x_i)]^2 \qquad (2)$$

Then, consistent estimates for both thresholds, $\{g_k\}$, and the model parameters, $\{\theta_k\}$, can be obtained as:

$$\min_{\theta_1,\ldots,\theta_k,g_1,\ldots,g_k} \sum_{k=1}^{K} \sum_{x \in k_{th} regime} [y_i - f(\theta, x_i)]^2 \quad (3)$$

An exemplary embodiment of the present invention estimates the optimal thresholds and parameters of the corresponding regimes:
1. Select lower and upper bound, L and U, typically the sample quantiles of X.
2. For each ordered sequence of L<g1<...<gk<U, compute:

$$L(g) = \sum_{k=1}^{K} \left[ \min \sum_{g_{k-1} < z_i < g_k} [y_i - f(\theta, x_i)]^2 \right] \quad (4)$$

3. Minimize L(g) to select the optimal thresholds and the corresponding model parameters.

For a more general case, where in the k-th regime $y_i = f(\theta_k, x_i) + \epsilon_i$, and $\epsilon_i \sim N(0, \sigma^2)$, an exemplary embodiment of the present invention uses the procedure above to minimize the joint loglikelihood function $$-\frac{1}{2} \sum_k \left[ nk\log(\sigma^2) + \sum_{x_i \in k_{th} regime} [y_i - f(\theta, x_i)]^2 / \sigma^2 \right] \quad (5)$$

obtaining the maximum likelihood estimate for $\{g_k\}$ and $\{\theta_k\}$.

An exemplary embodiment of the present invention is also applicable when the objective is to determine the number of regimes. This can be handled by minimizing a model selection criteria, such as Akaike Information Criteria (AIC). In the case of normal random errors, the AIC reduces to:

$$n \log(L(g)) + 2 \dim(g) \quad (6)$$

where:
g is the vector of thresholds.
In many applications the exact model formulae:

$$y_i = f(\theta_k, x_i) + \epsilon_i \quad (7)$$

is not known apriori. In such cases, an exemplary embodiment of the present invention finds partitions of the threshold variable z that discriminate the distribution of y.

In other words, an exemplary embodiment of the present invention finds a g that maximizes the distance between the conditional distributions $P(y|z \leq g)$ and $P(y|z>g)$. The distance can be any dissimilarity measures including ChiSquare ($\chi^2$) distance for discrete distributions, or KullbackLeiber (KL), and KolmogorovSmirnov (KS) distances for continuous distributions. Since KL distance relies on the probability density function, the nonparametric KS distance represents a more appropriate choice for the MIT dissimilarity measure. The KS distance between two samples of possibly different continuous distributions is defined as:

$$D = \sup_{-\infty < x < \infty} |S_1(x) - S_2(x)| \quad (8)$$

where:
S1 and S2 are the respective cumulative distributions.
Since, in many instances, very few assumptions on the distribution model can be made, there exist many different criteria for assessing how informative the threshold scheme is. Estimating the distance between $P(y|z \leq g)$ and $P(y|z>g)$ is one option. Another possibility is to look at $P(h(y,x)|z \leq g)$ and $P(h(y,x)|z>g)$, where h(.) is some well defined function of (x, y) (e.g. ay+bx, or any other relationship, depending on the goal of the analysis).

To test the proposed algorithm we will first consider a simple piecewise linear regression problem, $$yi = \begin{cases} 1.5 + 2x_i + \epsilon_i & x_i \leq 1 \\ 3 + 0.5x_i + \epsilon_i & x_i > 1 \end{cases} \quad (9)$$

where $\epsilon_i \sim N(0, 0.01)$ and $x_i$ are generated from a normal distribution N(1.2, 0.05). This is a special case of the threshold model, since the threshold variable is the same as the explanatory variable. An exemplary embodiment of the present invention performs the procedures described above, and reports the fitted values in Table 1 for sample sizes n=300, 500, 1000. Table 1 illustrates that the estimated threshold ĝ is clearly consistent.

TABLE 1

Estimated parameters from samples of variable sizes using the MIT algorithm-ĝ is the estimated threshold.

| sample size | ĝ | μ̂₁ | μ̂₂ | β̂₁ | β̂₂ |
|---|---|---|---|---|---|
| n = 300 | 1.05 | 1.60 | 3.12 | 1.89 | 0.42 |
| n = 500 | 1.07 | 1.54 | 3.00 | 1.93 | 0.49 |
| n = 1000 | 1.05 | 1.54 | 3.04 | 1.97 | 0.46 |
| True Value | 1.0 | 1.5 | 3.0 | 2.0 | 0.5 |

Another exemplary embodiment of the present invention may be a more complex business analytics application. One goal is to analyze the behavior of customers of an organization, and model the annual revenue growth of that organization as a function of other factors, including purchases from previous years, client satisfaction, awareness with the organization's brand, etc.

The following example uses 2001-2004 data for 765 major clients. The dependent variable is the revenue growth percentage y. Typically, client "behavior" (i.e. the expected revenue growth) varies depending on the purchase history. The "uncommitted" clients, who previously made only small purchases, are not likely to increase future spending, while the largest growth is expected from the clients who have already made significant investments in software and are very likely to continue to invest more in either new products or in the upgrades and maintenance of the existing ones. Therefore, we will treat the previous year's purchase z as our threshold variable. For the given data, the relationship between y and z is highly nonlinear. In fact, the correlation between these variables is close to zero, cor(y, z)=0.008, with p value of 0.85. Clearly, z has little predictive power for y, and consequently our revenue growth model will not benefit from including z into it. However, by performing MIT, an exemplary embodiment of the claimed invention is able to identify three regimes of z, across which the distribution of y significantly varies. The MIT algorithm may be implemented sequentially, as follows:

1. Select the lower and upper bound of thresholds, L and U, as 20%, 80% sample percentile of z.
2. Compute $$\max_{L<g<U} KS(y|z \le g, y|z > g),$$

where KS(.) is the Kolmogorov-Smirnov distance. Let $\hat{g}$ be the optimal threshold.

3. For each subsample defined by $z \le \hat{g}$ and $z > \hat{g}$ repeat Step 2.
If the stop criterion is reached, terminate the procedure.

The choice of the stopping criterion is wide open—one may simply impose a minimum bound on the subsamples, and stop further partitioning once the size of the subsample becomes smaller than the predetermined threshold. Another possible choice is to stop the procedure once the partition of a subsample returns an insignificant KS statistic.

Let us now consider a different example from the same application. We would like to understand if the increased (or decreased) customer satisfaction leads to increase (decrease) in spending with an organization. To do so, an exemplary embodiment of the present invention analyzes the relationship between the customer annual revenue growth and satisfaction score (CS). CS scores may be obtained through a survey conducted with customers. Respondents in the survey are told that CS scores [0, 3], [4, 7], and [8, 10] stand for "not consider organization for future purchase", "might consider organization" and "definitely consider organization".

Ideally, it is desireable to discover relationships that will support or reject hypotheses, such as, "satisfied customers are likely to increase spending". This requires that we label clients according to their revenue growth as "growing", "flat", and "declining", leading to the question of how to determine appropriate thresholds. A possible approach is to choose sample percentiles, such as [0.25, 0.75] percentile. However, as one object may be to find the exact relationship, an exemplary embodiment of the present invention will apply MIT and compare the subsamples $y|z \le g_1$, $y|g1 < z \le g_2$ and $y|z > g_2$, where y is the categorical variable corresponding to the three satisfaction intervals, and the threshold variable z is the annual revenue growth. As a dissimilarity metric, this embodiment uses $\chi^2$ distance. $\chi^2$ between two samples r and s may be defined as:

$$\chi^2 = \sum_{i=1}^{3} \left(\sqrt{S/R}\, R_i - \sqrt{R/S}\, S_i\right)^2 / (R_i + S_i) \tag{10}$$

where:
$N_i$ is the number of counts within level i; and
N is the sum of all counts in subsample n.

The MIT procedure identified the following regimes: $z \le 0.182$, $0.182 < z \le 0.268$ and $0.268 < z$. FIG. 2 shows a scatter plot of original sample and the relative frequency of the CS score in each regime, clearly indicating the difference in client satisfaction between the growing and declining clients.

An exemplary embodiment of the present invention estimates the relationship between the dependent and explanatory variables, in cases when the input data is overstretched and the input/output relationships cannot be explained with a single model.

First, for the regression models where the underlying functional form is known, an exemplary embodiment of the present invention provides a procedure that identifies the number of regimes, and estimates both the thresholds and model parameters. For such cases, an exemplary embodiment of the present invention establishes the consistency of the estimates. For cases when the model form is unknown, an exemplary embodiment of the present invention provides a nonparametric procedure that produces the most informative partition of samples.

FIG. 3 is a flowchart 300 of one exemplary method for thresholding of a database of customer purchasing history using a computer in accordance with the present invention as explained in detail above. The method starts at step 302 and continues to step 304 where a customer purchase history database including data regarding customer satisfaction, awareness of vendor brands, previous purchasing history, and size of customer budget is provided. The method continues to step 306 where a predetermined threshold regarding the data is provided. The method continues to step 308 where boundaries surrounding the predetermined threshold are provided. The method continues to step 310 where the data, in the computer, is split to maximize the differences in the data across the split. The method continues to step 312 where, a model of the data, in the computer, based upon the split is generated. The method continues to step 314 where marketing resources are allocated based upon the model and the method stops at step 316.

While the invention has been described in terms of several exemplary embodiments, those skilled in the art will recognize that the invention can be practiced with modification.

Further, it is noted that, Applicants' intent is to encompass equivalents of all claim elements, even if amended later during prosecution.

What is claimed is:

1. A method of thresholding of a database of customer purchasing history using a computer, the method comprising:
accessing a customer purchase history database including data regarding a customer satisfaction, an awareness of vendor brands, a previous purchasing history, and a size of a customer budget;
providing a predetermined threshold regarding said data;
establishing, using a processor in said computer, boundaries surrounding said predetermined threshold;
splitting said data, using said processor, to maximize differences in said data across said split;
generating, using said processor, a model of said data based upon said split; and
allocating marketing resources based upon said model.

2. The method of claim 1, wherein said generating of said model comprises estimating model parameters through a least square as:

$$\min_{\theta} \sum_{x \in k_{th} regime} [y_i - f(\theta, x_i)]^2$$

where:
y comprises a dependent variable in said database;
x comprises a vector of explanatory variables in said database;
$\{\theta_k\}$ comprise the model parameters; and
k comprises a number of different regimes in said database of a threshold variable z.

3. The method of claim 1, wherein said splitting said data comprises identifying a threshold for said split as:

$$\min_{\theta_1,\ldots,\theta_k,g_1,\ldots,g_k} \sum_{k=1}^{K} \sum_{x \in k_{th}regime} [y_i - f(\theta, x_i)]^2.$$

4. The method of claim 1, wherein said establishing boundaries surrounding said predetermined threshold comprises:
selecting a lower boundary L;
selecting an upper boundary U,
wherein splitting said data to maximize the differences in said data across said split and generating a model of said data based upon said split comprises:
for each ordered sequence of L<g1< . . . <gk<U, minimizing:

$$L(g) = \sum_{k=1}^{K} \left[ \min \sum_{gk-1<z_i<g_k} [y_i - f(\theta, x_i)]^2 \right].$$

5. A method of thresholding of a database of customer purchasing history using a computer, the method comprising:
accessing a customer purchase history database including data regarding a customer satisfaction, an awareness of vendor brands, a previous purchasing history, and a size of a customer budget;
providing a predetermined threshold regarding said data;
establishing, using a processor, boundaries surrounding said predetermined threshold;
splitting said data, using said processor, to maximize differences in said data across said split;
generating, using said processor, a model of said data based upon said split; and
allocating marketing resources based upon said model,
wherein said generating of said model comprises estimating model parameters, using said processor, through a least square as:

$$\min_{\theta} \sum_{x \in k_{th}regime} [y_i - f(\theta, x_i)]^2,$$

wherein:
y comprises a dependent variable in said database,
x comprises a vector of explanatory variables in said database,
$\{\theta_k\}$ comprise the model parameters,
k comprise a number of different regimes in said database of a threshold variable z,
wherein said splitting said data comprises identifying a threshold for said split as:

$$\min_{\theta_1,\ldots,\theta_k,g_1,\ldots,g_k} \sum_{k=1}^{K} \sum_{x \in k_{th}regime} [y_i - f(\theta, x_i)]^2,$$

wherein establishing, using said processor, boundaries surrounding said predetermined threshold comprises:
selecting, in said computer, a lower boundary L; and
selecting, in said computer, an upper boundary U, and
wherein splitting said data, in said computer, to maximize the differences in said data across said split and generating, in said computer, a model of said data, in said computer, based upon said split comprises:
for each ordered sequence of L<g1< . . . <gk<U, minimizing:

$$L(g) = \sum_{k=1}^{K} \left[ \min \sum_{gk-1<z_i<g_k} [y_i - f(\theta, x_i)]^2 \right].$$

6. A method for thresholding to determine a relationship between a dependent variable and explanatory variables across different regimes of a threshold variable, the method comprising:
identifying, using a processor in a computer, different regimes of a data set;
establishing, using said processor, a predetermined threshold within the data set;
establishing, using said processor, boundaries in the data set around the predetermined threshold;
splitting, using said processor, the data between said boundaries in the data set to establish split data sets;
generating, using said processor, a model based upon a maximum discriminabilty in the split data sets; and
allocating marketing resources based upon said model.

7. The method of claim 6, further comprising generating a model for each regime.

8. The method of claim 7, wherein the generating of the models comprises:
selecting optimal parameters for each regime;
selecting an upper bound and a lower bound for each regime; and
establishing a consistency of the thresholds.

9. The method of claim 6, wherein the identifying of regimes comprises computing a number of different regimes within the data set.

10. The method of claim 2, wherein said estimating model parameters comprises estimating a relationship between the dependent and explanatory variables, in cases when the input data is overstretched, and the input/output relationships cannot be explained with a single model.

* * * * *